Aug. 13, 1963   K. SCHWENK   3,100,667
SLIDING DOOR FOR MOTOR VEHICLES
Filed Jan. 24, 1961   3 Sheets-Sheet 1
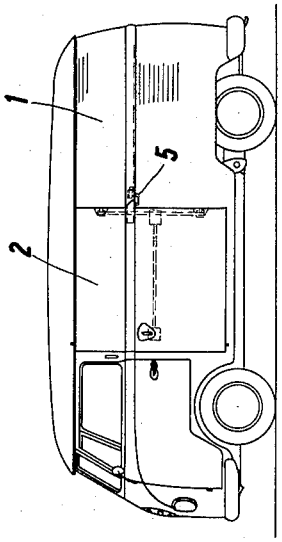
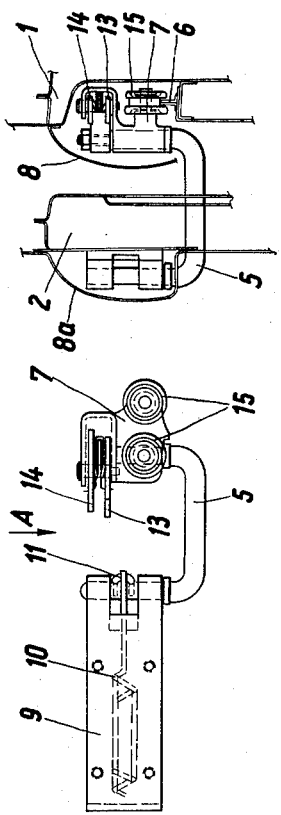
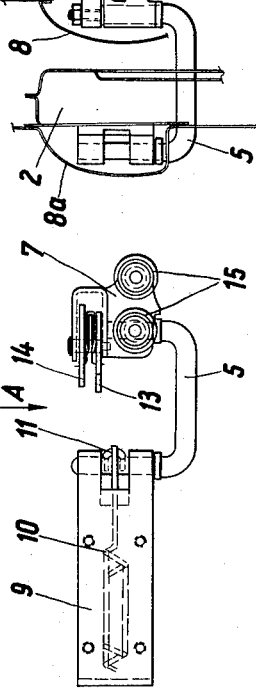
Inventor:
KURT SCHWENK Aug. 13, 1963   K. SCHWENK   3,100,667
SLIDING DOOR FOR MOTOR VEHICLES
Filed Jan. 24, 1961   3 Sheets-Sheet 2
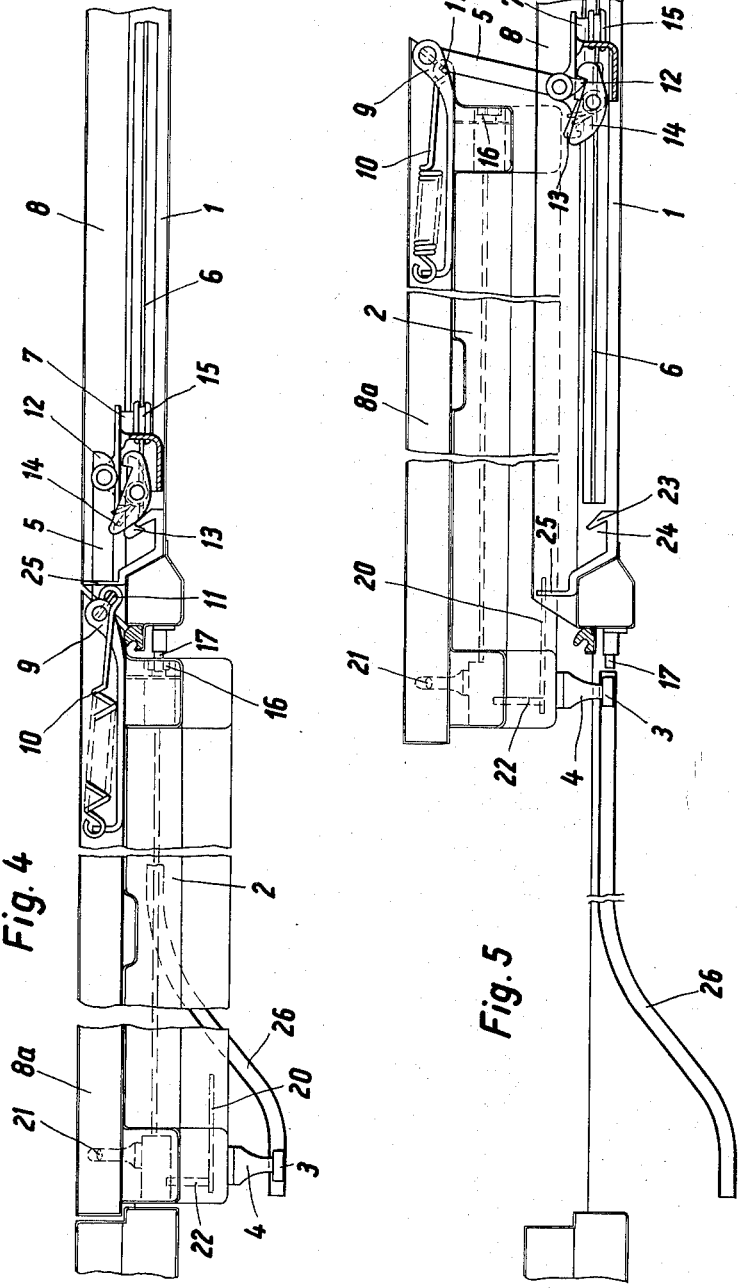
Inventor:
KURT SCHWENK

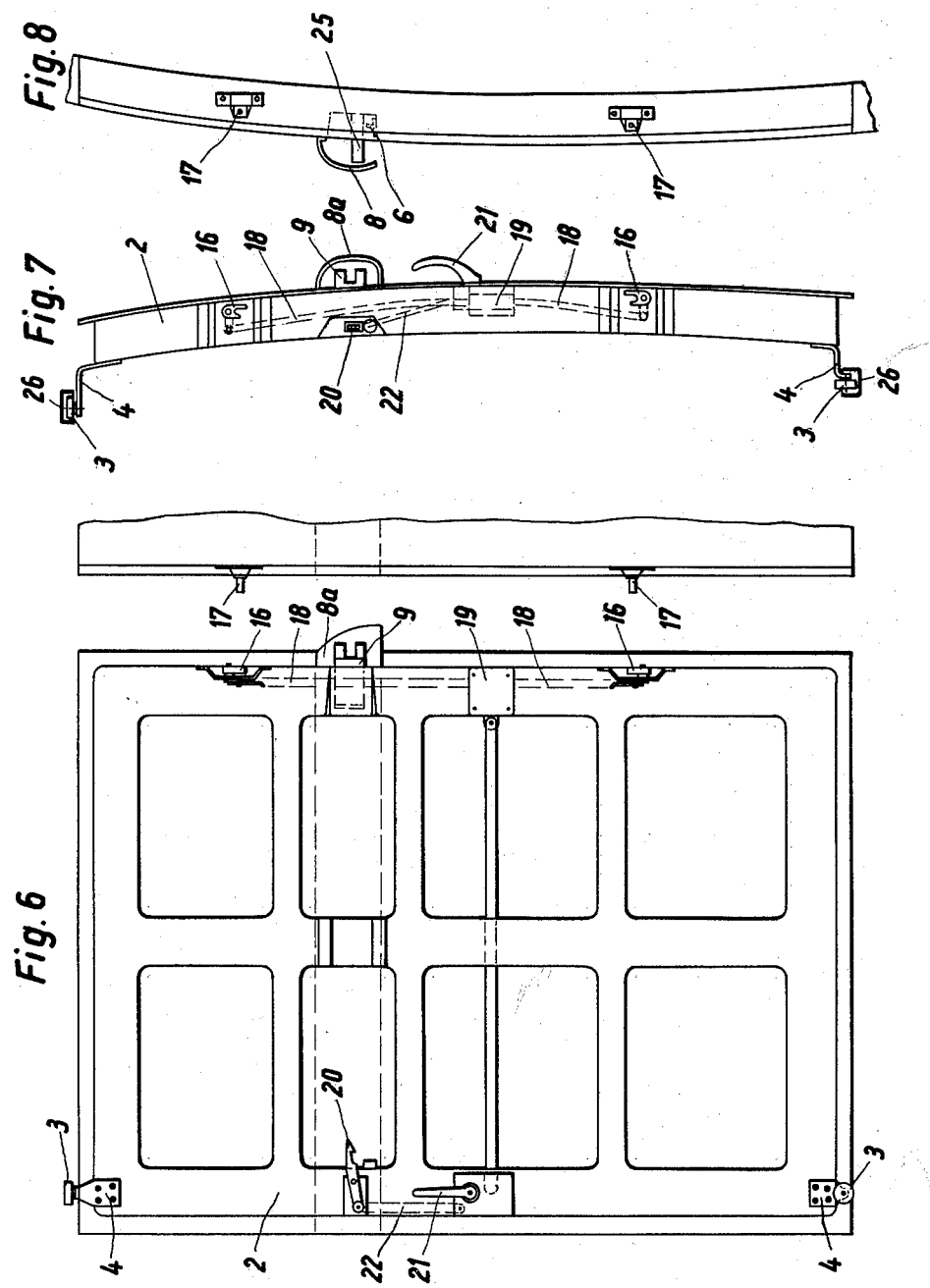

United States Patent Office 3,100,667
Patented Aug. 13, 1963

3,100,667
SLIDING DOOR FOR MOTOR VEHICLES
Kurt Schwenk, Wolfsburg, Hannover, Germany, assignor to Volkswagenwerk AG., Wolfsburg, Hannover, Germany, a German company
Filed Jan. 24, 1961, Ser. No. 84,966
Claims priority, application Germany Jan. 26, 1960
5 Claims. (Cl. 296—47)

The present invention relates to a sliding door for a motor vehicle said door being such that when it is shut it lies flush with the wall of the vehicle in which it is fitted.

One object of the invention is to provide a vehicle with a sliding door of this kind which is cheaper to produce than known sliding doors and is more suitable for mass production.

Another object of the invention is to provide a sliding door of the above kind with a suspension which ensures a reliability of operation, even in the case of mass produced doors, without undue expense.

In accordance with the present invention a sliding door is suspended at three points and for such suspension is provided at its front end at the top and bottom with rollers which run on rails secured to the body of the vehicle and at its rear end with a link by which the rear end of the door is pivoted to a carriage adapted to run along a rail extending along the wall of the vehicle body, said link permitting said door to be swung flush with the vehicle wall when the door is closed and upon opening the door to cause the rear end of the door to swing out of alignment with the vehicle wall. The carriage to which one end of the link is pivoted is held fast to the rail upon which it runs until the door is swung out of alignment with the vehicle wall and is preferably spring-biased to tend to hold the door in its swung-out position. Upon the door reaching its swung-out position the link releases a drop catch holding the carriage fast to its rail and is itself prevented from further swinging by a snap hook.

The drop catch and snap hook are respectively operated and released automatically upon the carriage running against an abutment when the door is pulled closed. Preferably the rear end of the door which is guided by the said link has two rotary claw catches arranged at or towards the top and bottom of the door respectively to retain the door in a closed position. The claw catches are spring-biased and upon releasing the door by means of the door handle the claw catches urge the door out of alignment with the wall so that it can be slid back.

A U-shaped link may be chosen, its arrangement and guidance effecting reliable swinging of the rear edge of the door in and out of the plane of the vehicle wall. A cover plate or beading is preferably provided to cover the rail upon which the carriage runs, the beading or cover masking the carriage, and the shank end of the U-shaped link pivoted thereto. The visible part of the U-shaped link, when the door is closed, is parallel to the beading so that there are no projecting parts when the door is closed and the entire guide system gives a closed impression.

The closure of the door at two positions on its rear edge, namely towards the top and the bottom, ensures a firm hold of the door and allows the pressure of a door-seal to be uniformly received. In order to avoid closure on one point only, bars extend from the upper and lower claw catches to a central lock in which the actual closing operation is effected. The provision of rotary claw catches permits the co-operation of a spring by means of which the door is urged out of alignment with its frame by the locking mechanism. A spring is first compressed by the opening movement of the door handle in order then to press out the lever of the rotary claw catches. Finally a latch is provided which, when the door is fully opened, locks said door against closing. This latch is raised as soon as the door handle is manipulated to close the door. The transmission ratios are selected such that, when the door handle is moved in the closing direction, the lever disengages and releases the door for closing.

The invention is described in greater detail hereinafter by way of example only with reference to the accompanying drawings, in which:

FIG. 1 is a side elevation of a box-type vehicle having a sliding door according to the invention;

FIG. 2 is an enlarged side view of a U-shaped link guiding the rear side of the door;

FIG. 3 is an end view of the link when the door is in the swung-out position;

FIG. 4 is a plan view of a section of the vehicle side wall with the door in closed position;

FIG. 5 is a plan view of a section of the vehicle side wall with the door in open position;

FIG. 6 is a side elevation of the inner side of the door;

FIG. 7 is an end elevation of the door shown in FIG. 6, and

FIG. 8 is an end elevation of the front end of the post shown in FIG. 6.

Referring to the drawings, a side opening in the side wall 1 of a box-type vehicle is closed by a sliding door 2 which is located flush with the wall in its closed condition. The door 2 slides by rollers 3 at its front end at the top and bottom in corresponding rails 26 on the body of the vehicle, the ends of said rails 26 guiding the front end of the door into the plane of the wall. The rollers are journalled on suitable brackets 4. At its rear end the door 2 is guided by means of a U-shaped link 5 on a rail 6 secured to the wall of the vehicle and covered in by a metal strip 8. The U-shaped link 5 is secured like a hinge, by one end to a hinge plate 9 secured to the door 2, and by its other end to a roller carriage 7; that is to say, is pivotably connected to the two parts. The metal strip 8, covering the outside of the rail 6 which is sunk in the wall 1 of the vehicle, is formed so that it also covers the shank of the link 5 which is pivotably connected to the carriage 7. Secured to the hinge plate 9 mounted in the door 2 and holding the other end of the link 5 is a spring 10 which engages a lever arm 11 on the shank of the link 5 in such manner as to assist the swinging out of the link and the door into the open position. On its vehicle-side shank, the link 5 has a lever arm 12 at one end which, when the U-shaped link 5 is in a swung-out position, releases a hook lever or drop latch 13 mounted on the carriage 7 from the recess 24 formed by the inclined hook element 23 carried by the side wall 1, and at the same time is engaged and retained by a second hooked lever 14 similarly carried by the carriage 7. As shown in FIG. 4, the first hooked lever 13 and the second hooked lever 14 are each pivotally mounted on a common pivot pin carried by the carriage 7, with the hook portion of the lever 13 at one end extending downwardly engaging the hook element 23. The second hooked lever 14 has its hook element at one end remote from the hook element of the first hooked lever extending upwardly, and when the door is in closed position, as shown in FIG. 4, is not in operating or latching position. The opposite non-hooking end of the hooked lever 13 extends part way up alongside the hook element of the hooked lever 14 such that when the U-shaped link is being swung out to the position shown in FIG. 5, the lever arm 12 riding down into engagement with the first hooked lever 14 will first engage the hooked lever 13, causing the hook portion thereof to pivot upwardly, thereby releasing the carriage 7 from the hook element 23. The carriage 7 is provided with two adjacently arranged rollers 15 which slide on the rail 6. When the rear end of the door is swung into the plane of the wall, forked rotary catches 16 provided respectively towards the top and bottom of the rear end of the door engage a bar 17 secured to the vehicle wall so that the door in its closed condition is locked at the top and bottom by said rotary catches 16. The rotary catches 16 are connected by rods 18 to a central lock 19 in which the actual closure is effected. Fitted in the lock 19 is a spring which, upon the opening movement of the door handle 21, is first compressed and which, upon a further movement of the door handle by which the lock is then finally unlocked, displaces the tines of the forked rotary catches 16 forcibly in the direction of the swinging out movement of the rear end of the door out of the wall. A lever 20 at the front end of the door can drop into a corresponding notch in the wall of the vehicle to secure said door in its completely opened condition from closing. The lever 20 is raised and disengaged as soon as the closure of the door 2 is initiated by the handle 21 whereupon the door 2 can be drawn into the closed position.

The door operates in such a manner that when the door is open, the U-shaped link 5, assisted by the spring 10 attached at one end to the lever arm 12, is swung out in a vertical axis and at right angle to the side wall 1. This action results in the lever arm 12 of the link 5 first engaging the lever 13 to depress same, thereby releasing the hook portion of the lever 13 from the hook element 23, thereby disengaging the carriage 7. The further inward movement of the lever arm 12 results in an engagement thereof with the spring loaded hook portion of the lever 14 located on the roller carriage 7 and rotatable on the same pivot as lever 13. This action results in the lever arm 12 being locked with the hook portion of the lever 14 and retained in this position. Further, the spring 10 secured to the opposite end of the lever arm 11 and to the door 2 insures that the U-shaped link 5 is not only swung out, but is also held in its right angle position in a locked state.

In the closing of door 2, the front nose of the lever 14 (seen in the direction of closing) abuts against the stop 23 located behind the front face of the wall, and cam 12 of the U-shaped link 5 disengages from the hooked notch at the end of the lever 14, thereby releasing the stoppage of the U-shaped link 5 in the lever 14. The U-shaped link 5 can now pivot its arm secured to the carriage 7 and thereby guide the rear end of the door into the wall opening and into the plane of the wall. About simultaneously with the release of the U-shaped link 5, the second hooked drop latch 13 drops into the notch 24 behind the stop 23 and thus blocks the carriage 7 against any displacement on its rail 6. In this way, the door 2 is safely guided into the door opening, whereby the cinematic energy taken up by the door when pushed into closed position produces tensioning of the spring 10, which is used for opening the door. The door must have sufficient force to overcome the counterforce of said spring and also to compress the rubber sealing placed around the door opening to such an extent that the catches 16 enter into locking engagement with the pegs 17.

The choice of the U-shaped link and its arrangement and guidance effect reliable swinging of the rear end of the door into and out of alignment with the wall and the simultaneous closure of this end of the door. The articulated link arrangement occupies very little space. A further advantage resides in the feature that the top of the outwardly projecting bead 8a is pressed into the inner sheeting of the door so that, when the door is fully opened, the upper and lower rails for the front rollers need permit only the movement which corresponds approximately to the thickness of the door. By this means the upper and lower rails, which are curved inwardly at the ends of the rails, are kept very flat and do not extend to the inside of the coachwork.

I claim:

1. In a vehicle having a wall with an opening closed by a sliding door, the improvement comprising a pair of rails mounted on said wall above and below said opening respectively in parallel relationship to one another, rollers pivotally mounted to the front end of the door at the top and bottom to run on said rails, a third rail parallel to the pair of rails and extending in said vehicle wall to one side of said opening in sunk-in relationship, carriage means having rollers mounted thereon for movement along said third rail, U-shaped link means having vertical legs secured to the door at its rear end and to said carriage, respectively, for pivotal movement about vertical axes formed by said legs to permit the door to swing flush with the vehicle wall when the door is closed, and upon opening of the door to effect a swinging of the rear end of the door out of alignment with the vehicle wall, protecting strips mounted on said door to cover said carriage, the rail for said carriage, and the shank of said U-shaped link means, and means for manipulating the door to open and close it.

2. A vehicle in accordance with claim 1, which further includes spring means between a leg of said link means and the vehicle door to spring bias the door toward its swung-out position.

3. A vehicle in accordance with claim 1, which further includes means to retain the carriage fixed on the third rail when the door is being swung in or out, and locking means for locking said link in its swung-out position.

4. A vehicle in accordance with claim 3, which further includes an abutment for the carriage for the forward position of said door, means for automatically operating said carriage retaining means and releasing said locking means by running said carriage against said abutment, and means on said link means for automatically releasing said carriage retaining means and actuating said locking means upon the door being swung out.

5. In a vehicle having a wall with an opening closed by a sliding door, a pair of parallel rails on said wall extending above and below said opening respectively, rollers pivotally mounted to the front end of the door at the top and bottom for movement on said rails, a rail secured to said vehicle wall intermediate the top and bottom of said opening and parallel to the first claimed rails and extending in sunk-in relationship to one side of said opening, a carriage having rollers adapted to run along the last claimed rail, a U-shaped link having vertical legs secured to the door at its rear end and to said carriage, respectively, for pivotal movement about vertical axes formed by said legs to permit the door to swing flush with the vehicle wall when the door is closed and, upon opening of the door, to cause the rear end of the door to swing out of alignment with the said vehicle wall, a lever arm on said link, first spring means between said lever arm and said door to spring bias the door towards its swung-out position, means retaining said carriage fixed on its rail when said door is being swung in or out, locking means mounted on said carriage to lock said U-shaped link in its swung-out position against pivotal movement, protecting strips secured to the vehicle wall and covering said carriage, said rail for said carriage, and the shank of said U-shaped link, two rotary catches mounted at the front edge of the door respectively towards its top and bottom, retaining means on said vehicle wall for engaging said rotary catches, a lock mechanism, rods connecting said rotary catches to said lock mechanism, a door handle for releasing said lock mechanism, second spring means in said lock mechanism and operable upon manipulation of the door handle to open the door to rotate said rotary catches to swing the door out of alignment with said vehicle wall, an abutment for said carriage for the forward position of said door, means for operating said drop catch and releasing said snap hook by running of the carriage against said abutment, and means on said link for automatically releasing said drop catch and operating said snap hook upon the door being swung out.

References Cited in the file of this patent
UNITED STATES PATENTS 2,839,331    Smith _____ June 17, 1958

FOREIGN PATENTS 709,914    Great Britain _____ June 2, 1954
1,029,605    France _____ Mar 11, 1953